(12) United States Patent
Alali et al.

(10) Patent No.: US 11,339,640 B2
(45) Date of Patent: May 24, 2022

(54) METHOD AND SYSTEM OF DRILLING WITH GEOLOGICALLY-DRIVEN RATE OF PENETRATION

(71) Applicant: SAUDI ARABIAN OIL COMPANY, Dhahran (SA)

(72) Inventors: Ammar Alali, Dhahran (SA); Arturo Magana Mora, Dhahran (SA); Timothy E. Moellendick, Dhahran (SA); William Contreras Otalvora, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/890,356

(22) Filed: Jun. 2, 2020

(65) Prior Publication Data

US 2021/0372263 A1 Dec. 2, 2021

(51) Int. Cl.
*E21B 44/00* (2006.01)
*E21B 21/08* (2006.01)
(Continued)

(52) U.S. Cl.
CPC ............. *E21B 44/00* (2013.01); *E21B 21/08* (2013.01); *E21B 44/02* (2013.01); *E21B 44/06* (2013.01);
(Continued)

(58) Field of Classification Search
CPC .......... E21B 44/00; E21B 44/02; E21B 44/04; E21B 44/06; E21B 44/08; E21B 45/00;
(Continued)

(56) References Cited

U.S. PATENT DOCUMENTS 7,020,597 B2 * 3/2006 Oliver .................... E21B 44/00
703/7
8,210,283 B1 * 7/2012 Benson .................. E21B 45/00
175/61

(Continued)

FOREIGN PATENT DOCUMENTS

| CN | 110500081 A | 11/2019 |
|---|---|---|
| WO | 2014062174 A1 | 4/2014 |
| WO | 2014/121448 A1 | 8/2014 |

OTHER PUBLICATIONS

International Search Report for corresponding International Application No. PCT/US2020/037142, dated Feb. 5, 2021 (7 pages).
(Continued)

*Primary Examiner* — Tara Schimpf
(74) *Attorney, Agent, or Firm* — Osha Bergman Watanabe & Burton LLP

(57) ABSTRACT

A method of drilling includes obtaining historical data for historical wells in a field, determining a set of drilling parameters, and determining a set of hole section sizes defining a wellbore geometry. For each combination of a parameter in the set of parameters and a hole section size in the set of hole section sizes, historical wells having average values of the parameter exceeding a threshold for the hole section size from the historical surface drilling data are selected. An expected output for each of a model to be trained by each of the selected historical wells is derived based on a rate of penetration while drilling. A final model is trained with the selected historical wells and expected outputs. An operating envelope is determined for each of the parameters in the set of parameters from the trained model. The operating envelopes may be used to guide drilling of a well in the field.

18 Claims, 14 Drawing Sheets

(51) Int. Cl.
  *E21B 44/06* (2006.01)
  *E21B 45/00* (2006.01)
  *E21B 49/00* (2006.01)
  *G05B 13/02* (2006.01)
  *G05B 13/04* (2006.01)
  *E21B 44/02* (2006.01)
(52) U.S. Cl.
  CPC .............. *E21B 45/00* (2013.01); *E21B 49/00* (2013.01); *G05B 13/0265* (2013.01); *G05B 13/042* (2013.01); *E21B 2200/20* (2020.05)
(58) Field of Classification Search
  CPC ...... E21B 47/00; E21B 47/003; E21B 47/013; E21B 2200/22
  See application file for complete search history.

(56) References Cited

U.S. PATENT DOCUMENTS

| | | | |
|---|---|---|---|
| 10,316,653 | B2 | 6/2019 | Coffman et al. |
| 10,364,663 | B2 | 7/2019 | Hohl et al. |
| 10,400,573 | B2 | 9/2019 | Yang et al. |
| 2004/0182606 | A1* | 9/2004 | Goldman ................ E21B 12/02 175/39 |
| 2005/0267719 | A1 | 12/2005 | Foucault |
| 2006/0173625 | A1 | 8/2006 | Moran |
| 2008/0262810 | A1 | 10/2008 | Moran et al. |
| 2015/0218914 | A1 | 8/2015 | Marx et al. |
| 2015/0300151 | A1* | 10/2015 | Mohaghegh ............ E21B 47/10 702/9 |
| 2016/0053603 | A1 | 2/2016 | Israel et al. |
| 2016/0076357 | A1 | 3/2016 | Hbaieb |
| 2018/0087351 | A1 | 3/2018 | Johnston et al. |
| 2019/0169986 | A1 | 6/2019 | Storm, Jr. et al. |
| 2019/0293824 | A1 | 9/2019 | Liu et al. |
| 2019/0345809 | A1 | 11/2019 | Jain et al. |

OTHER PUBLICATIONS

Written Opinion for corresponding International Application No. PCT/US2020/037142, dated Feb. 5, 2021 (8 pages).

* cited by examiner

METHOD AND SYSTEM OF DRILLING WITH GEOLOGICALLY-DRIVEN RATE OF PENETRATION

BACKGROUND

The drilling efficiency of a well depends on the rate of penetration (ROP), which is the rate at which the drill bit breaks rock in order to deepen a wellbore. ROP is typically measured in feet per hour or meters per minute. A high ROP indicates fast drilling operations. However, ROP has to be balanced with other aspects of drilling. For example, cuttings are produced as the drill bit breaks rock. These cuttings need to be transported away from the drill bit in order to enable the drill bit to continue breaking new rock. Typically, the drilling fluid pumped down the drill string is also used to carry the cuttings away from the drill bit. If the rate at which cuttings are produced exceed the rate at which the cuttings can be transported away from the drill bit efficiently, as may be the case with a high ROP, inadequate hole cleaning can occur, which may ultimately lead to stuck pipe incidents. Operations will need to be carried out to release the stuck pipe. During these operations, drilling may have to be suspended. Any period during which drilling is not occurring is known as non-productive time (NPT). Other events that induce NPT besides stuck pipe may occur during a drilling operation and as a result of drilling practices. NPT events increase overall operational costs and drilling time. In this regard, drilling efficiency also depends on NPT incurred during a drilling operation. There is a need for a method and system of drilling that enhances ROP while minimizing NPT.

SUMMARY

A method of drilling includes obtaining historical data for historical wells in a field. The historical data includes historical surface drilling data and geological formation tops data. The method includes determining a set of parameters of a drilling operation and determining a set of hole section sizes defining a wellbore geometry. For each combination of a parameter in the set of parameters and a hole section size in the set of hole section sizes, the method includes selecting a plurality of historical wells having average values of the parameter exceeding a threshold for the hole section size from the historical surface drilling data. Each of the plurality of historical wells is to train a model for the combination of hole section size and parameter. The method includes deriving an expected output for each of a model to be trained by each of the plurality of historical wells based on a rate of penetration while drilling. The method includes training a final model with the plurality of historical wells and expected outputs. The method includes determining an operating envelope for each of the parameters in the set of parameters from the trained model. The method may include adjusting the historical wells in each of the plurality of historical wells to have aligned formation tops with a target set of formation tops prior to deriving the expected outputs. The act of selecting a plurality of historical wells having average values of the parameter exceeding a threshold for the hole section size from the historical surface drilling data may include selecting the plurality of historical wells having hole sections that meet a set of predetermined conditions including (a) the hole sections have the hole section size, (b) the hole sections are drilled with the same mud type, (c) the hole sections are drilled with the same bit type, and (d) the hole sections are drilled with the same drilling plan. The act of selecting a plurality of historical wells having average values of the parameter exceeding a threshold for the hole section size from the historical surface drilling data may include selecting candidate historical wells that meet the set of predetermined conditions, each of the candidate historical wells having an average value of the parameter for a hole section with the hole section size; ranking the candidate historical wells according to the average value of the parameter for the hole section size; and selecting a predetermined top number of the ranked candidate historical wells as the plurality of historical wells. Alternatively, the act of selecting a plurality of historical wells having average values of the parameter exceeding a threshold for the hole section size from the historical surface drilling data may include selecting candidate historical wells that meet the set of predetermined conditions, each of the candidate historical wells having an average value of the parameter for a hole section with the hole section size; and selecting the candidate historical wells with an average value of the parameter exceeding the threshold. The act of deriving an expected output for each of a model to be trained by each of the plurality of historical wells based on a rate of penetration while drilling may include, for each hole section size in the set of hole section sizes, removing from consideration any historical wells having drilling-induced non-production time in the hole section size for which the plurality of historical wells is to train a model. The act of deriving an expected output for each of a model to be trained by each of the plurality of historical wells based on a rate of penetration while drilling may include, for each of the plurality of historical wells, determining a depth step rate, and for each depth step, selecting at least three wells from the plurality of historical wells based on rate of penetration values of the historical wells for the depth step and generating at least three separate values for the parameter for which the plurality of historical wells is to train a model based on the at least three wells. The act of generating at least three separate values for the parameter for which the plurality of historical wells is to train a model based on the at least three wells may include ranking the at least three wells by nearest neighbor. The method may further include unifying a depth frequency of the historical data in a depth domain. The act of determining the set of parameters of a drilling operation may include determining a set of parameters including rate of penetration during drilling, weight on bit during drilling, rotational speed of a drill string during drilling, and flow rate of at least one pump during drilling. Each of the preceding acts may be carried out by a computer processor. The method may further include guiding drilling of a well in the field with the operating envelopes. The act of guiding drilling of a well in the field with the operating envelopes may include selectively adjusting a control setpoint for each of the parameters based on the respective operating envelope. Alternatively, the act of guiding drilling of a well in the field with the operating envelopes may include monitoring a rate of penetration of the drilling operation as a function of depth and selectively adjusting a control setpoint for each of the parameters in response to a deviation of the rate of penetration of the drilling operation from a predetermined value for a current depth of the drilling operation, where the predetermined value is based on an operating envelope for the rate of penetration obtained from the trained model.

A method of drilling a well in a field includes performing a drilling operation by operating a drill string to drill a hole section of a wellbore in the field, the hole section having a selected hole section size. The method includes determining a set of parameters related to the drilling operation. The method includes obtaining an operating envelope for each of the parameters in the set of parameters from a model trained with a plurality of historical wells in the field having an average rate of penetration of drilling for the selected hole section size that exceeds a threshold and a zero drilling-induced non-production time for the selected hole section size. The method includes selectively adjusting a control setpoint for each of the set of parameters based on the respective operating envelope. The method may include monitoring a rate of penetration of the drilling operation as a function of depth and selectively adjusting the control setpoint for each of the set of parameters in response to a deviation of the rate of penetration of the drilling operation from a predetermined value for a current depth of the drilling operation, where the predetermined value is based on an operating envelope for the rate of penetration obtained from the model.

A non-transitory computer medium stores instructions executable by a computer processor. The instructions include functionality to obtain historical data for historical wells in a field, the historical data including historical surface drilling data and geological formation tops data; determine a set of parameters of a drilling operation; and determine a set of hole section sizes defining a wellbore geometry. For each combination of a parameter in the set of parameters and a hole section size in the set of hole section sizes, the instructions include functionality to select a plurality of historical wells having average values of the parameter exceeding a threshold for the hole section size from the historical surface drilling data, where each of the plurality of historical wells is to train a model for the hole section size and the parameter. The instructions include functionality to derive an expected output for each of a model to be trained by each of the plurality of historical wells based on a rate of penetration while drilling. The instructions include functionality to train or trigger training of a final model with the plurality of historical wells and expected outputs. The instructions may include functionality for adjusting the historical wells in each of the plurality of historical wells to have aligned formation tops with a target set of formation tops prior to deriving the expected output. The instructions may include functionality to select the plurality of historical wells having hole sections that meet a set of predetermined conditions including (a) the hole sections have the hole section size, (b) the hole sections are drilled with the same mud type, (c) the hole sections are drilled with the same bit type, and (d) the hole sections are drilled with the same drilling plan. The instructions may include functionality to remove from consideration any historical wells having drilling-induced non-production time in the hole section size for which the plurality of historical wells is to train a model for each hole section size in the set of hole section sizes. The instructions may include functionality to obtain an operating envelope for each of the parameters in the set of parameters from the trained model. The instructions may include functionality to guide drilling of a well in the field with the operating envelopes.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
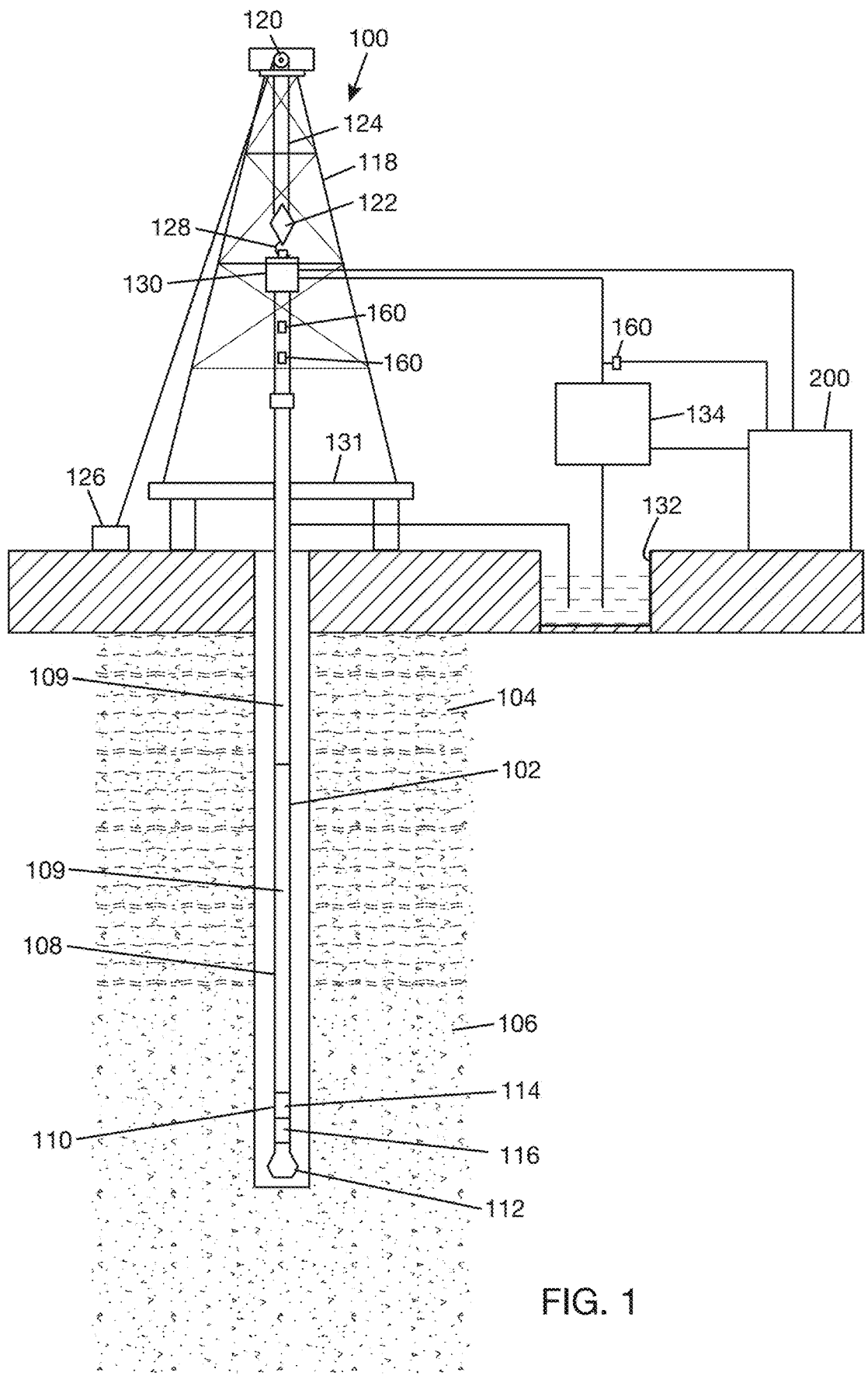
FIG. 1 is a schematic diagram of an exemplary well site.

In this detailed description, certain specific details are set forth in order to provide a thorough understanding of various disclosed embodiments and implementations. However, one skilled in the relevant art will recognize that embodiments and implementations may be practiced without one or more of these specific details, or with other methods, components, materials, and so forth. In other instances, well known features or processes associated with drilling systems have not been shown or described in detail to avoid unnecessarily obscuring descriptions of the embodiments and implementations. For the sake of continuity, and in the interest of conciseness, same or similar reference characters may be used for same or similar objects in multiple figures.

A system to support and guide adjustment of parameters of a drilling operation (drilling parameters) is described. In one implementation, the drilling parameters include weight on bit (WOB) during drilling, flow rate of mud pump(s) (FLWPMPS), which may be expressed in gallons per minute (GPM), drill string or drill bit rotational speed, which may be expressed in rotations (or revolutions) per minute (RPM), and rate of penetration (ROP) while drilling. ROP is a measure of the rate at which a length of a wellbore increases during drilling. ROP is affected by many factors, such as WOB, FLWPMPS, RPM, drilling fluid hydraulics, and formation type. The system guides adjustment of drilling parameters to achieve an optimum ROP while drilling. The optimum ROP is defined as the fastest rate of penetration for a particular well in a particular geological formation while minimizing drilling hazards such as stuck pipe incidents and well control. The system uses historical data from the best performing historical wells in a field to train a model that produces the recommended values for the drilling parameters in real-time. As such, values for the drilling parameters are extracted from the historical wells with the fastest drilling records as a function of ROP per field and hole section size (i.e., hole size of a hole section). In terms of drilling operations, all considered historical wells for model training follow the same drilling plan, mud type, and drilling bit type as the new well that would benefit from the system. The historical wells considered for model training are vetted against drilling problems that incur any drilling-induced non-production time (NPT) for a particular hole section size. The historical drilling data from the historical wells considered for model training are flattened per formation horizons anticipated in the new well such that all drilling parameters are aligned based on geological formation. The best performing historical wells with the highest measured ROP at each predetermined depth step are selected as training input for the model. The resulting geologically guided model represents the best formation specific drilling practices per depth step that contributes to avoiding any drilling practices that might lead to NPT. Consequently, the recommendations by the resulting geologically guided model are the best drilling practices to yield the optimum energy required to break the specific geological formation.

FIG. 1 illustrates an exemplary well site 100 in which the system to support and guide adjustment of parameters of a drilling operation may be employed. In general, well sites may be configured in a myriad of ways. Therefore, well site 100 is not intended to be limiting with respect to the particular configuration of the drilling equipment. Well site 100 is depicted as being on land. In other examples, well site 100 may be offshore, and drilling may be carried out with or without use of a marine riser. A drilling operation at well site 100 may include drilling a wellbore 102 into a subsurface including various formations, such as formations 104, 106. For the purpose of drilling a new section of wellbore 102, a drill string 108 is suspended within wellbore 102. Drill string 108 includes one or more drill pipes 109 connected to form a conduit and a bottom hole assembly (BHA) 110 appended to the end of the conduit. BHA 110 includes a drill bit 112 to cut into rock of formations. BHA 110 may include measurement tools, such as measurement-while-drilling (MWD) tool 114 and logging-while-drilling (LWD) tool 116. Measurement tools 114, 116 may include sensors and hardware to measure downhole drilling parameters, and these measurements may be transmitted to the surface using any suitable telemetry system known in the art. BHA 110 and drill string 108 may include other drilling tools known in the art but not specifically shown.

Drill string 108 is suspended in wellbore 102 by a derrick 118. A crown block 120 is mounted at the top of derrick 118, and a traveling block 122 hangs down from crown block 120 by means of a cable or drilling line 124. One end of cable 124 is connected to a drawworks 126, which is a reeling device that can be used to adjust the length of cable 124 so that traveling block 122 moves up or down derrick 118. Traveling block 122 may include a hook 128 on which a top drive 130 is supported. Top drive 130 is coupled to the top of drill string 108 and is operable to rotate drill string 108. Alternatively, drill string 108 may be rotated by means of a rotary table (not shown) on the drilling floor 131. Drilling fluid (commonly called mud) may be stored in a pit 132, and at least one pump 134 may pump the mud from pit 132 into drill string 108. The mud may flow into drill string 108 through appropriate flow paths in top drive 130 (or a rotary swivel if a rotary table is used instead of a top drive to rotate drill string 108).

In one implementation, a system 200 is disposed at or communicates with well site 100. System 200 may control at least a portion of a drilling operation at well site 100 by providing controls to various components of the drilling operation. In one implementation, system 200 may receive data from one or more sensors 160 arranged to measure controllable parameters of the drilling operation. As a non-limiting example, sensors 160 may be arranged to sense WOB (weight on bit), RPM (drill string rotational speed), FLWPMPS (flow rate of the mud pumps), and ROP (rate of penetration of the drilling operation). Sensors 160 may be positioned to measure parameter(s) related to rotation of drill string 108, parameter(s) related to travel of the traveling block 122, which may be used to determine ROP of the drilling operation, and parameter(s) related to flow rate of pump 134. For illustration purposes, sensors 160 are shown on drill string 108 and proximate an outlet of mud pump 134. The illustrated locations of sensors 160 are not intended to be limiting, and sensors 160 could be disposed wherever drilling parameters need to be measured. Moreover, there may be many more sensors 160 than shown in FIG. 1 to measure various other parameters of the drilling operation. Each sensor 160 would be configured to measure a desired physical stimulus.

During a drilling operation at well site 100, drill string 108 is rotated relative to wellbore 102, and weight is applied to drill bit 112 to enable drill bit 112 to break rock as drill string 108 is rotated. In some cases, drill bit 112 may be rotated independently with a drilling motor. While cutting rock with drill bit 112, mud is pumped into drill string 108. The mud flows down drill string 108 and exits into the bottom of wellbore 102 through nozzles in drill bit 112. The mud in wellbore 102 then flows back up to the surface in an annular space between drill string 108 and wellbore 102 with entrained cuttings. The mud with the cuttings is returned to pit 132 to be circulated back again into drill string 108. Typically, the cuttings are removed from the mud, and the mud is reconditioned as necessary, before pumping the mud again into drill string 108. In one implementation, the drilling operation may be controlled by system 200. In particular, system 200 may provide controls to components of the drilling operation according to a scheme that enhances ROP while minimizing NPT for the particular formation to be drilled.

Figure 2:
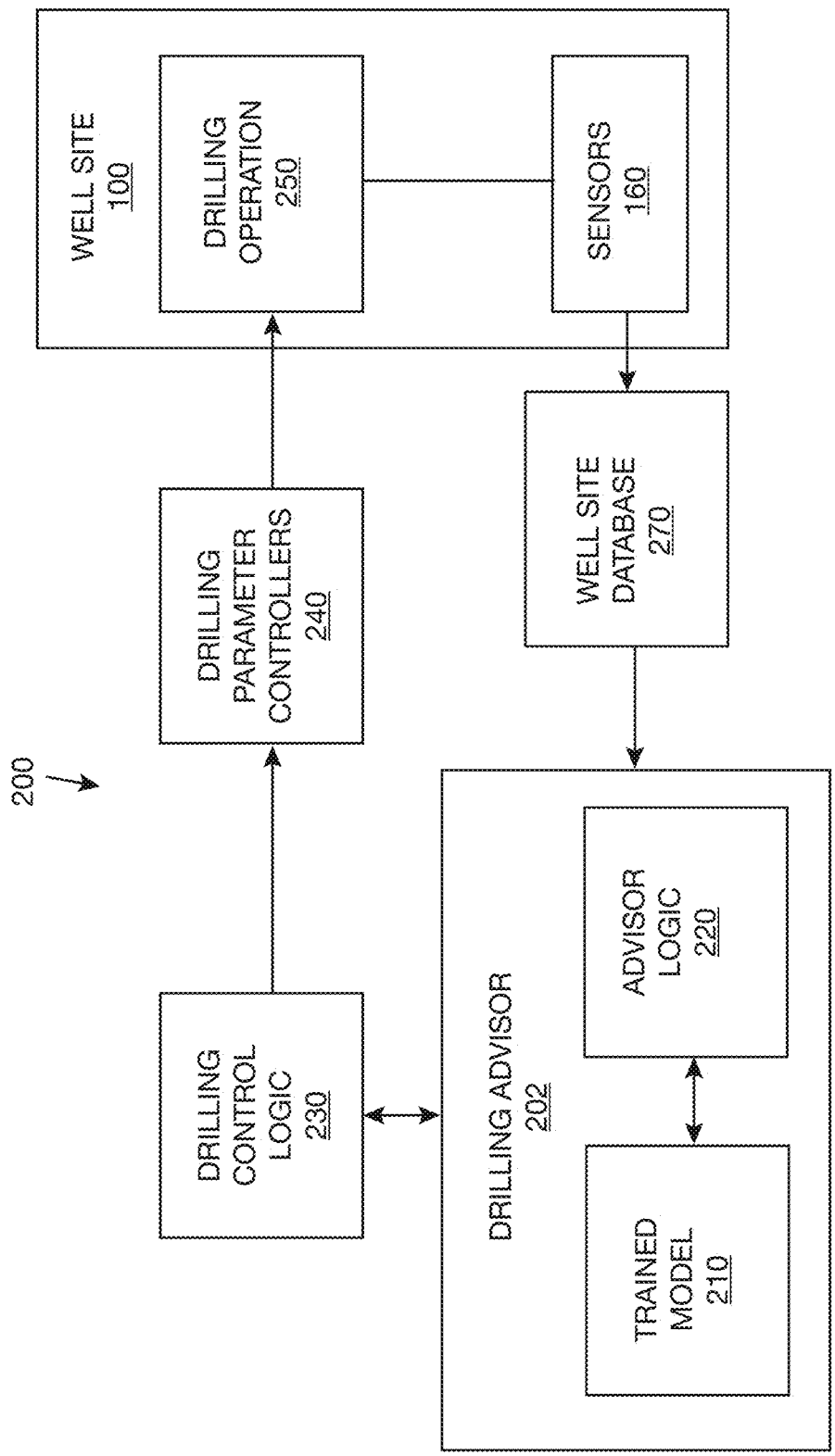
FIG. 2 is a block diagram of a system for controlling drilling of a well at a well site according to one illustrative implementation.

FIG. 2 is a block diagram showing an example implementation of system 200. In the illustrated implementation, system 200 includes a drilling advisor 202 to advise drilling of a new well. Drilling advisor 202 includes a trained model 210 that generates operating envelopes for drilling parameters. An operating envelope for a drilling parameter defines permitted values for the drilling parameter based on best drilling practices to yield optimum ROP while minimizing NPT. The operating envelope may be expressed as a function of depth and formation. Examples of drilling parameters for which trained model 210 may generate operating envelopes include, but are not limited to, ROP (rate of penetration of the drilling operation), WOB (weight on bit), RPM (drill string rotational speed), and FLWPMPS (flow rate of mud pump(s)). Drilling advisor 202 includes advisor logic 220, which communicates with trained model 210. System 200 may include drilling control logic 230 that is communicatively coupled to drilling advisor 202. In one implementation, advisor logic 220 may receive data for a planned well and a section of the planned well to be drilled from drilling control logic 230. Advisor logic 220 may correlate the planned well and section to trained model 210 and obtain the operating envelopes for drilling parameters from trained model 210 for the section. Advisor logic 220 may select (or recommend) values for the drilling parameters from the operating envelopes and provide the selected (or recommended) values to drilling control logic 230.

In one implementation, system 200 includes drilling parameter controllers 240. Drilling control logic 230 may generate control setpoints for drilling parameter controllers 240 based on the values received from advisor logic 220. The outputs of drilling parameter controllers 240 may control at least a portion of a drilling operation 250 at well site 100. These controllers may be control loop mechanisms typically used in industrial control systems or may be transmitters. For illustration purposes, drilling parameter controllers 240 may include a ROP controller (to control ROP of the drilling operation), a WOB controller (to control WOB of the drilling operation), RPM controller (to control RPM of the drilling operation), a FLWPMPS controller (to control FLWPMPS of the drilling operation), and other controllers, e.g., a torque controller to control torque applied to the drill string involved in the drilling operation. In practice, drilling parameter controllers 240 may include other controllers besides these examples, depending on aspects of drilling operation 250 to be controlled from the surface of the well site. In some cases, ROP controller may not directly output a control to drilling operation 250. Instead, ROP controller may output control setpoints to other drilling parameter controllers, such as WOB controller, RPM controller, and FLWPMPS controller. In other cases, drilling parameter controllers 240 may not include ROP controller in that ROP may be controlled by controlling other drilling parameters.

System 200 may include a well site database 270 that is updated in real-time with data related to drilling operation 250. In one example, the real-time data related to drilling operation 250 may come from sensors 160 that are arranged at well site 100 to measure controllable drilling parameters (or measure variables from which controllable drilling parameters can be derived). As an non-limiting example, sensors 160 may include sensor(s) arranged to sense WOB, sensor(s) arranged to sense RPM, sensor(s) arranged to sense FLWPMPS, and sensor(s) arranged to sense ROP or parameters from which ROP can be derived. Advisor logic 220 may query well site database 270 for real-time data related to ROP for a section of a well that is being drilled. In one implementation, as advisor logic 220 receives real-time ROP data for a current depth and formation that is being drilled, advisor logic 220 compares the current ROP to the operating envelope for ROP for the section being drilled. If the current ROP deviates from the optimum ROP for the current depth and formation, advisor logic 220 may select (or recommend) new values for WOB, RPM, and FLWPMPS within their respective operating envelopes in an attempt to move ROP closer to the optimum value. Advisory logic 220 may provide the new values for WOB, RPM, and FLWPMPS to drilling control logic 230, which may correspondingly adjust the control setpoints for drilling parameter controllers 240. Advisor logic 220 may continuously monitor ROP by querying or automatically receiving real-time ROP data from well site database 270 and may trigger adjustments to control setpoints for drilling parameters based on the monitoring.

Figure 3:
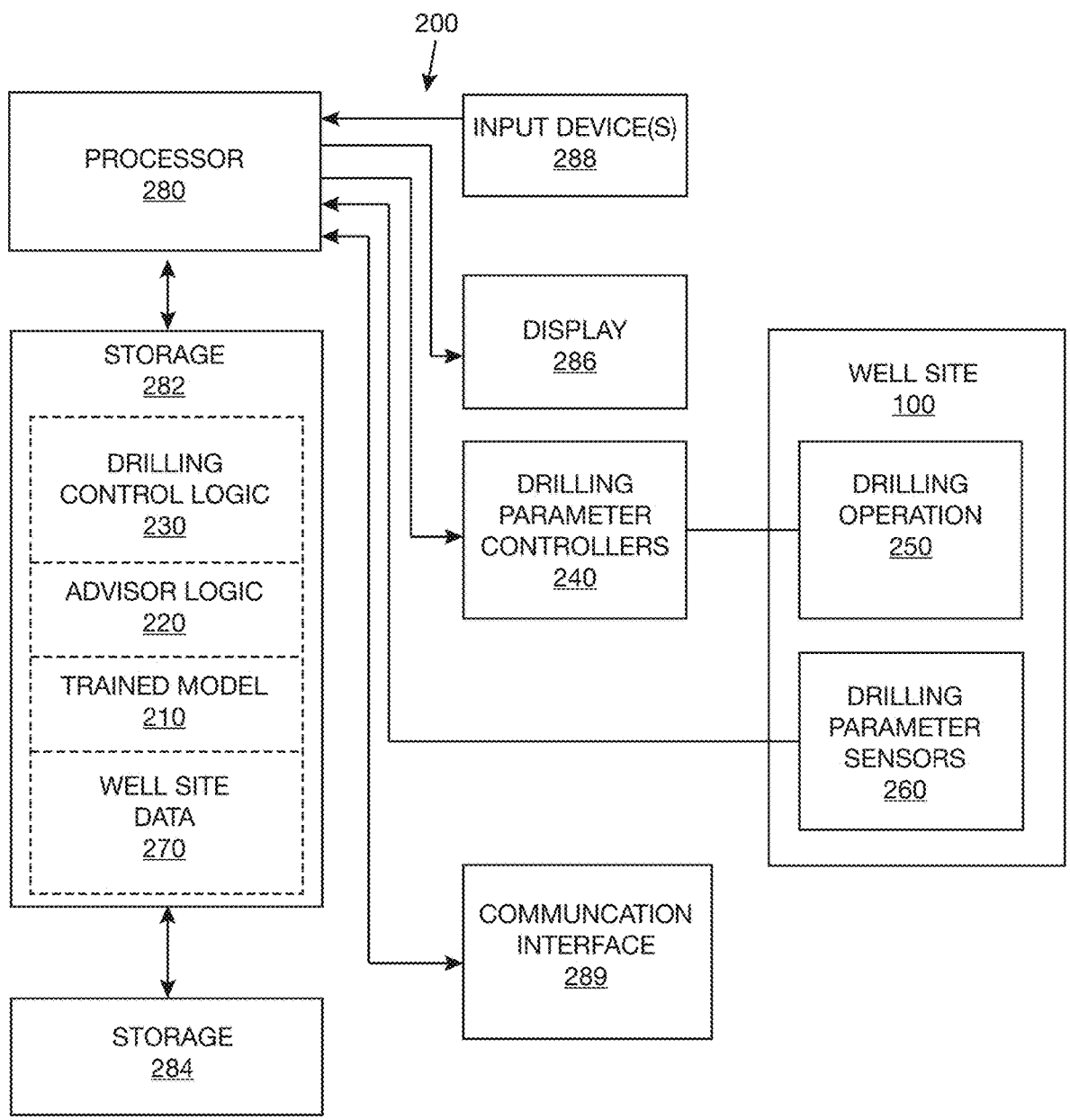
FIG. 3 is a block diagram of the system of FIG. 2 modified to include a computing environment according to one illustrative implementation.

In one implementation, drilling control logic 230, advisor logic 220, trained model 210, and well site database 270 are computer readable instructions and/or data. In this case, as shown in FIG. 3, system 200 may further include a processor 280, non-persistent storage 282 (e.g., volatile memory, such as random access memory (RAM), or cache memory), and persistent storage 284 (e.g., a hard disk, an optical drive such as a compact disk (CD) drive or digital versatile disk (DVD) drive, or a flash memory). Drilling control logic 230, advisor logic 220, trained model 210, and well site database 270 may be stored in storage 284 and loaded into storage 282 as needed for processing by processor 280. Processor 280 may be an integrated circuit for processing instructions. For example, processor 280 may be one or more cores or micro-cores of a processor. System 200 may include an electronic display 286. In some cases, processor 280 may present a user interface of advisor logic 220 and/or a user interface of drilling control logic 230 on display 286. System 200 may include input device(s) 288, such as keyboard and mouse, for interaction with display 286. System 200 may include a communication interface 289 (e.g., Bluetooth interface, infrared interface, network interface, or optical interface) for connection to a network. System 200 may be a standalone system or may be a node on a network. In the latter case, all or portions of advisor logic 220 and drilling control logic 230 may be executed by a remote processor.

Figure 4A:
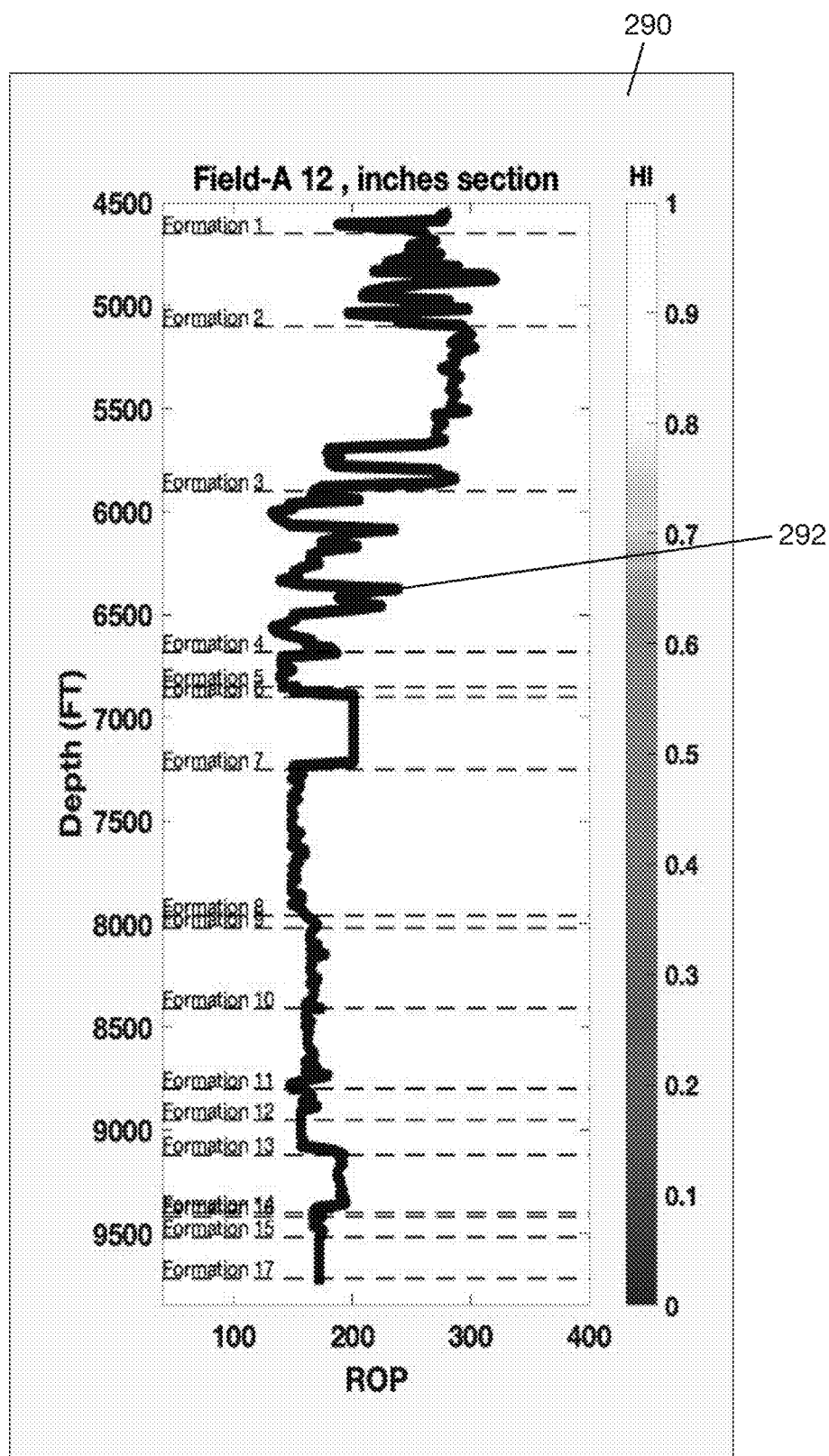
FIG. 4A is a portion of a screenshot of an interface showing an operating envelope for rate of penetration (ROP) parameter for a hole section.
Figure 4B:
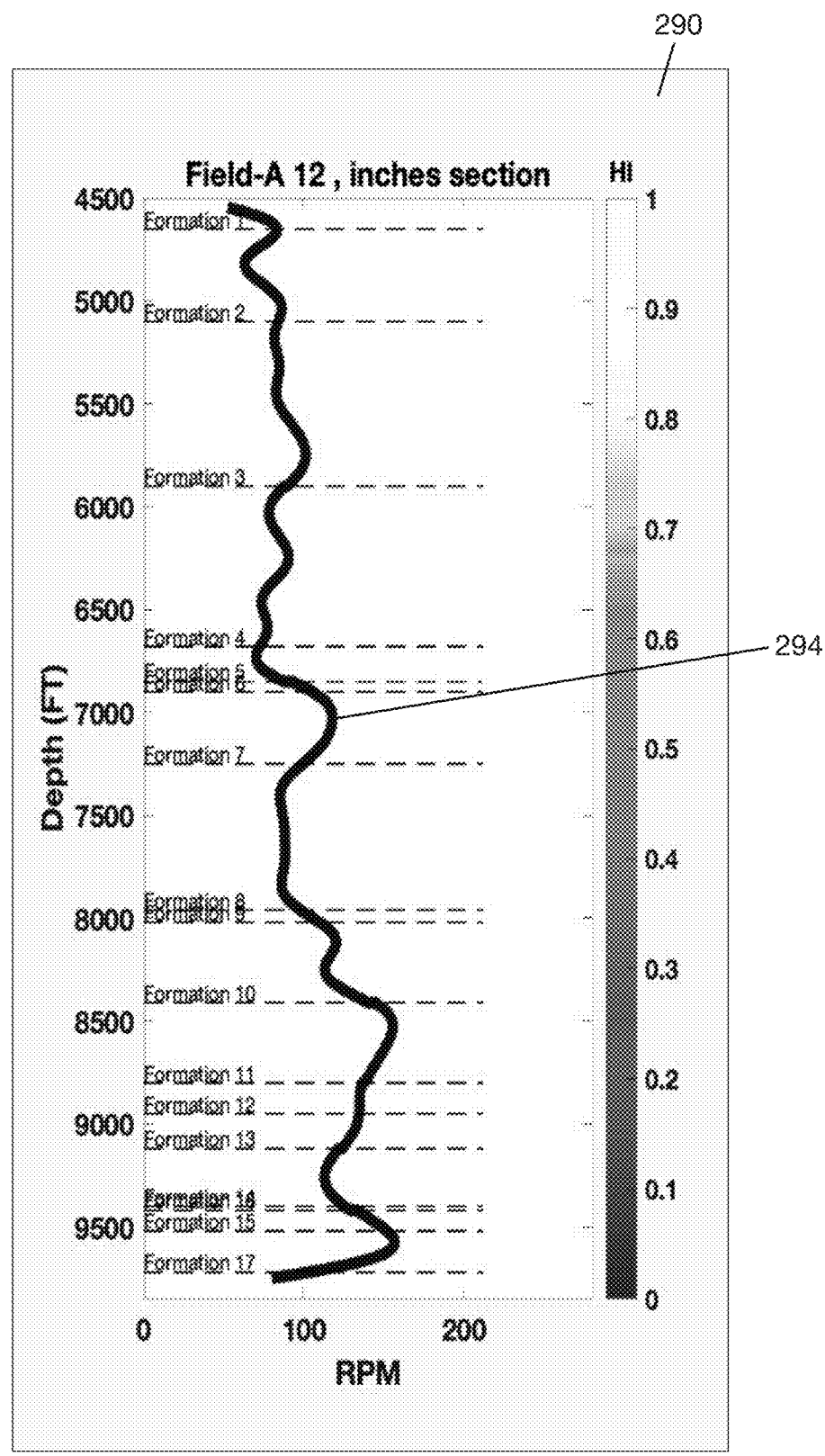
FIG. 4B is a portion of a screenshot of an interface showing an operating envelope for rotations per minute (RPM) parameter for a hole section.
Figure 4C:
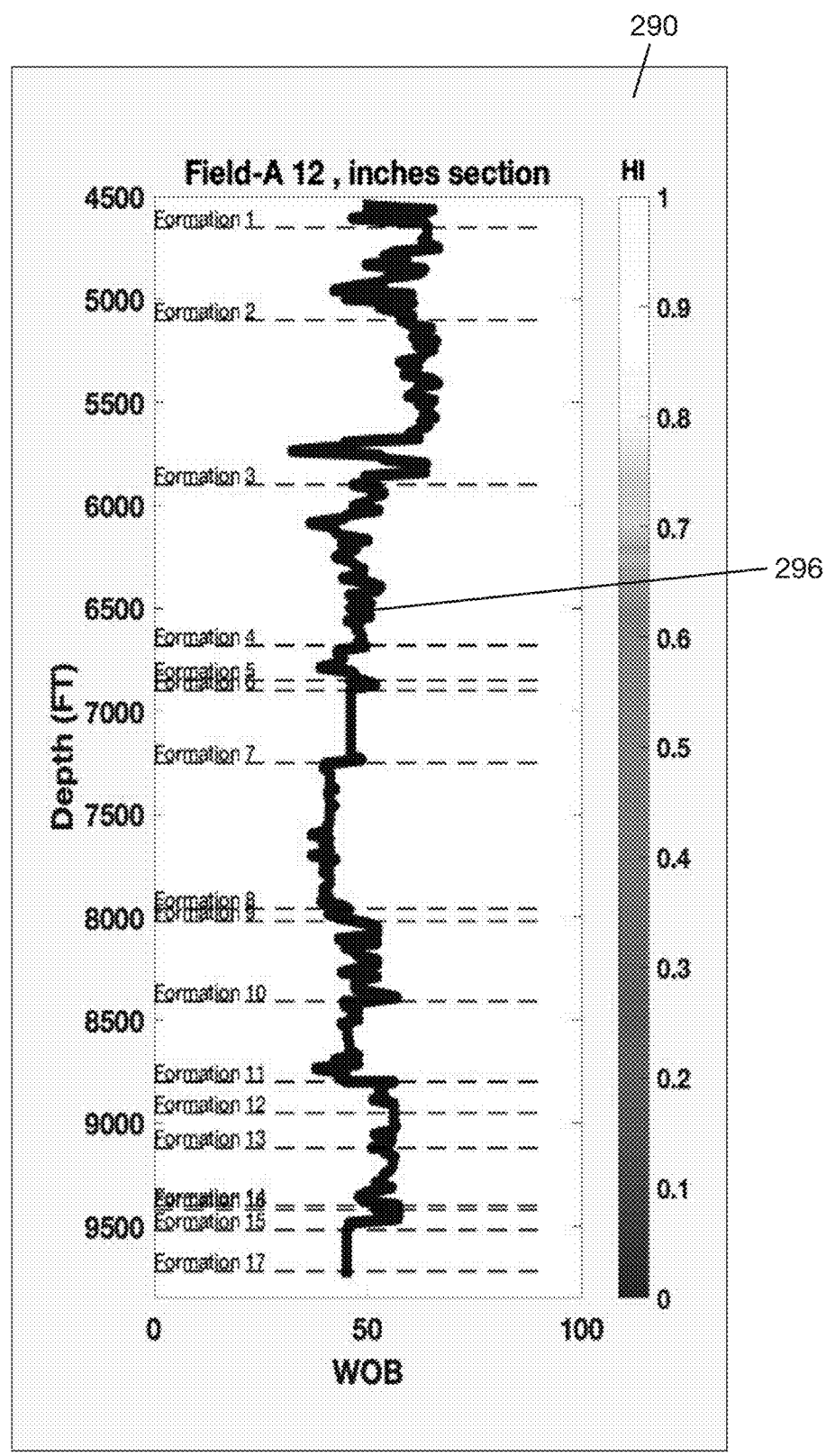
FIG. 4C is a portion of a screenshot of an interface showing an operating envelope for weight on bit (WOB) parameter for a hole section.
Figure 4D:
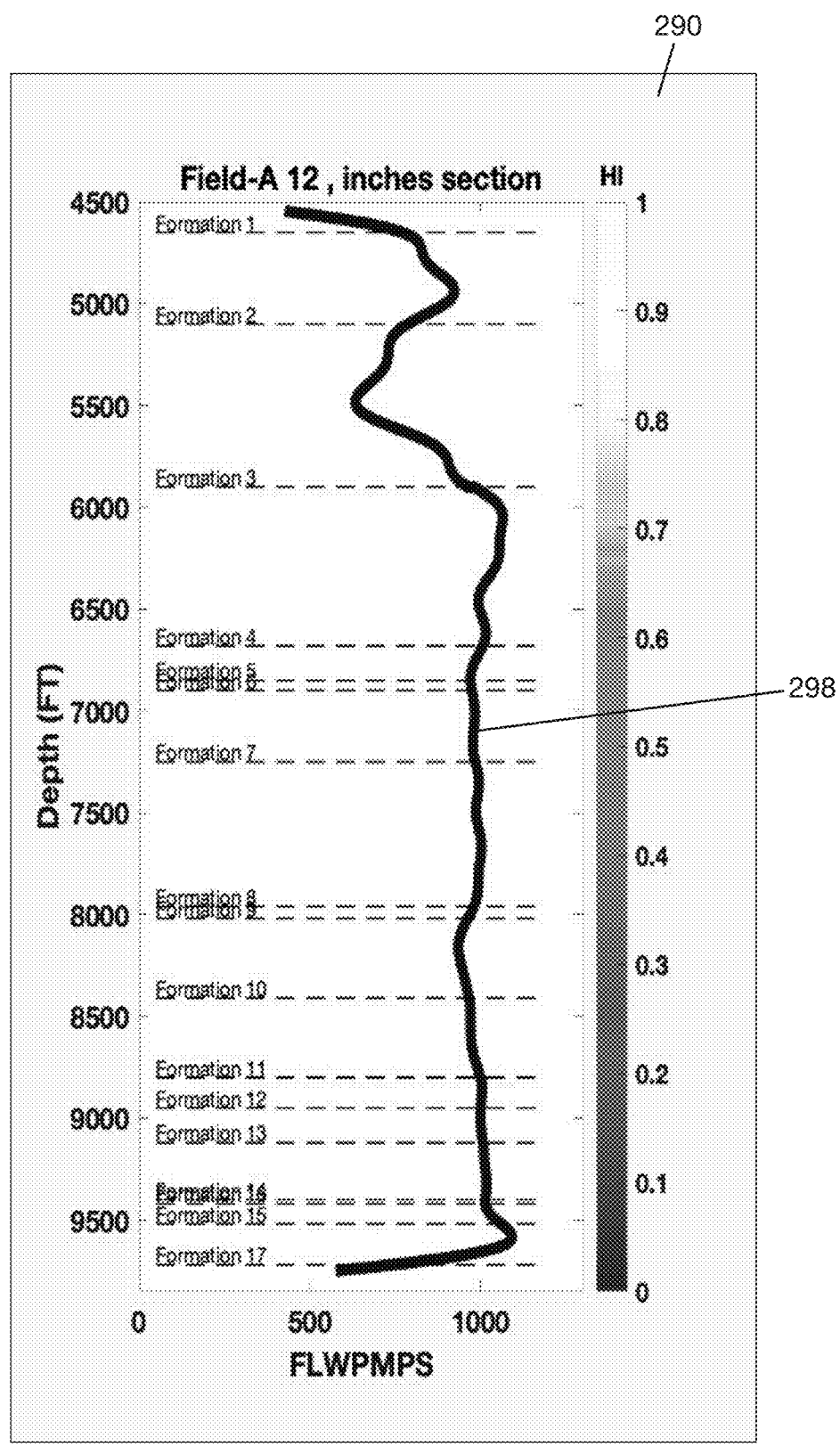
FIG. 4D is a portion of a screenshot of an interface showing flow rate of mud pump(s) (FLWPMPS) parameter for a hole section.

Advisor logic 220 may output an interface showing operating envelopes for drilling parameters provided by trained model 210. The interface may also show real-time data relative to the operating envelopes. For illustration purposes, FIGS. 4A-4D show portions of an interface 290 that may be presented on display 286 (in FIG. 3). The plots shown in FIGS. 4A-4D may be arranged side by side on display 286. The plot in FIG. 4A shows an example optimum curve 292 for ROP. The operating envelope for ROP includes optimum curve 292 and may further include a level of uncertainty (i.e. the areas immediately adjacent to optimum curve 292). In the plot, HI represents the health index of the data, which in this case is 100% (i.e., the data is clean). The plot in FIG. 4B shows an example optimum curve 294 for RPM. The operating envelope for RPM includes optimum curve 294 and may further include a level of uncertainty (i.e., the areas immediately adjacent to optimum curve 294). The plot in FIG. 4C shows an example optimum curve 296 for WOB. The operating envelope for WOB includes optimum curve 296 and uncertainty (i.e., the areas adjacent to optimum curve 296). The plot in FIG. 4D shows an optimum curve 298 for FLWPMPS. The operating envelope for FLWPMPS includes optimum curve 298 and may further include a level of uncertainty (i.e., the areas immediately adjacent to optimum curve 298).

Figure 5A:
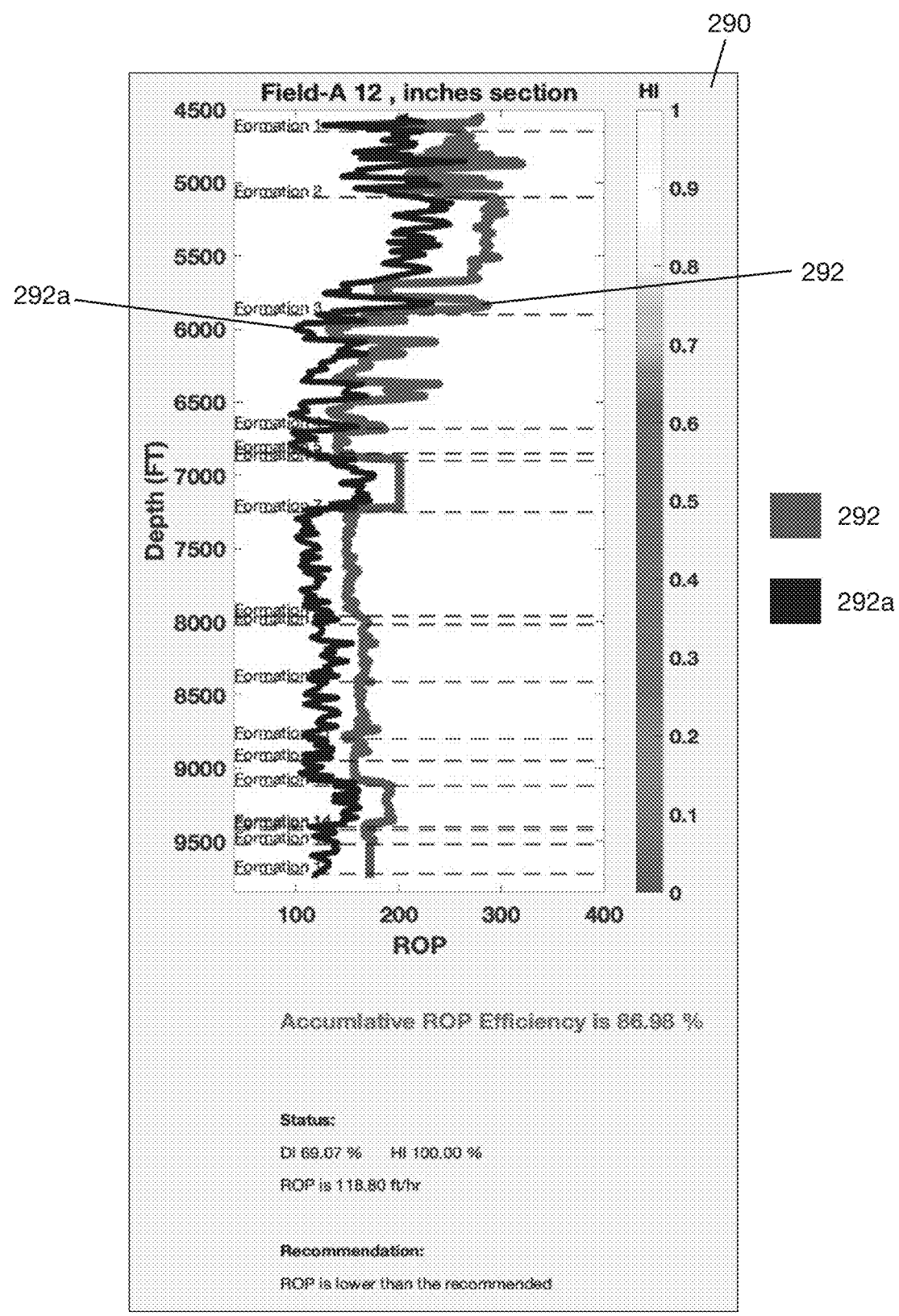
FIG. 5A shows live data superimposed on the operating envelope of FIG. 4A.
Figure 5B:
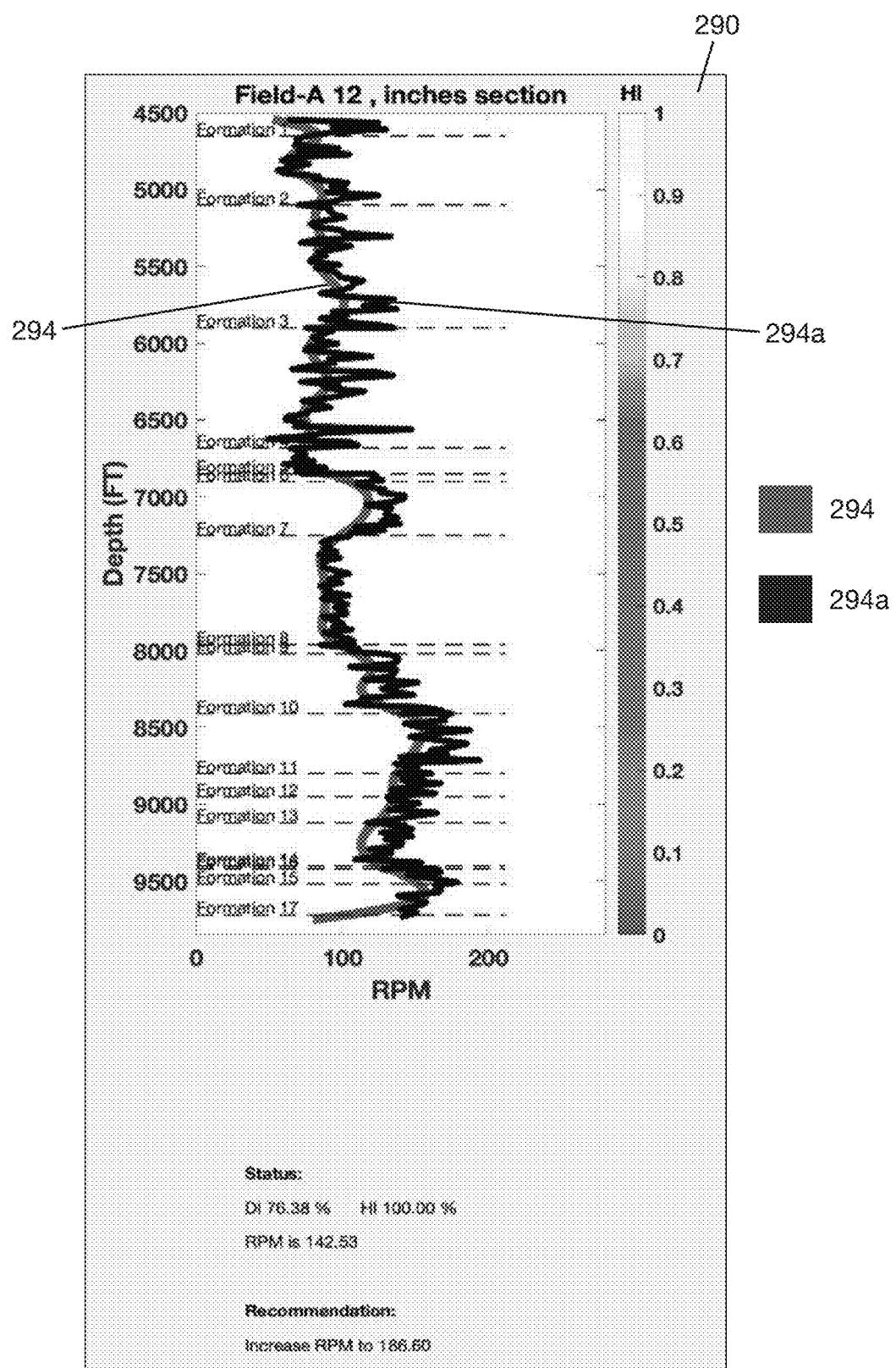
FIG. 5B shows live data superimposed on the operating envelope of FIG. 4B.
Figure 5C:
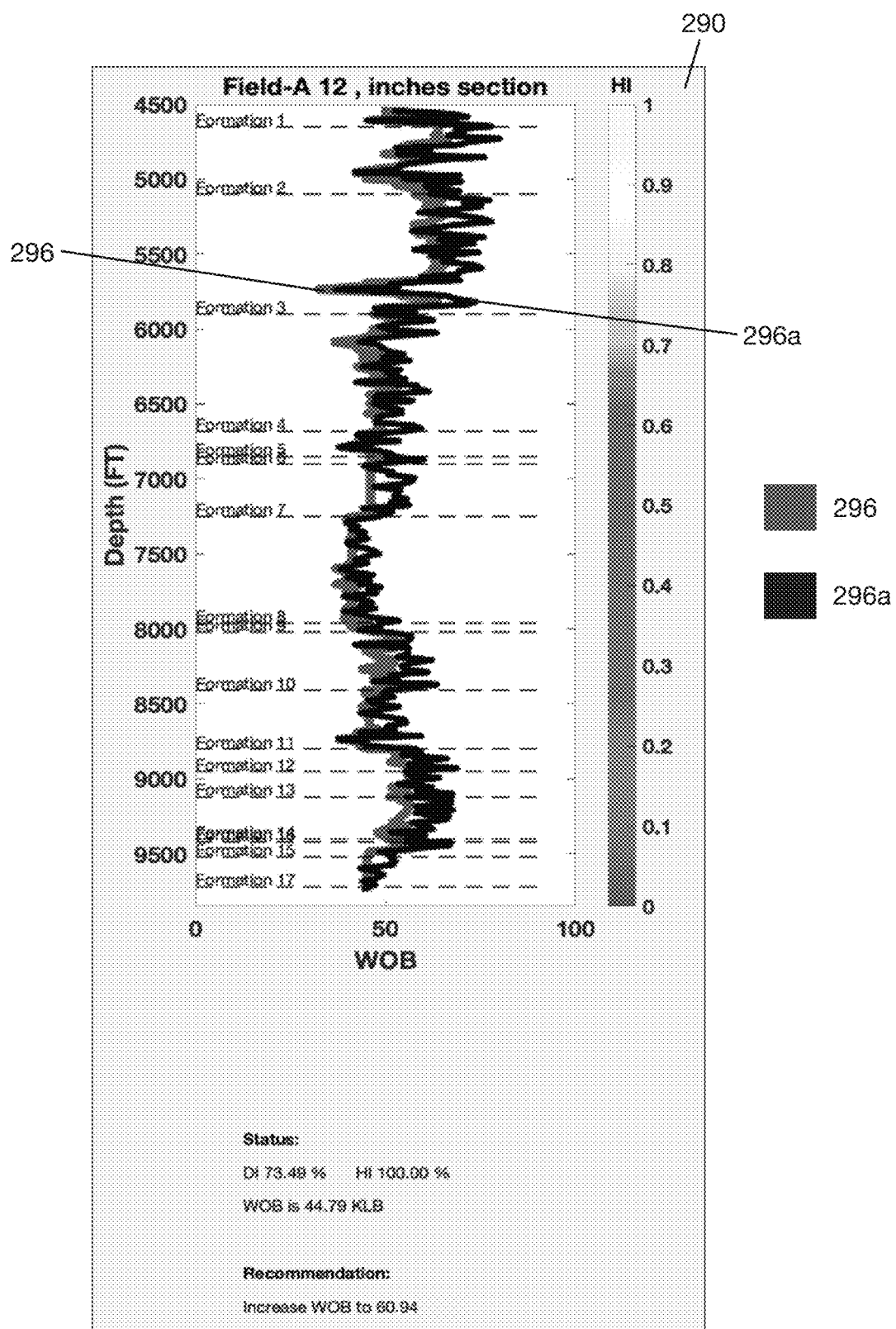
FIG. 5C shows live data superimposed on the operating envelope of FIG. 4C.
Figure 5D:
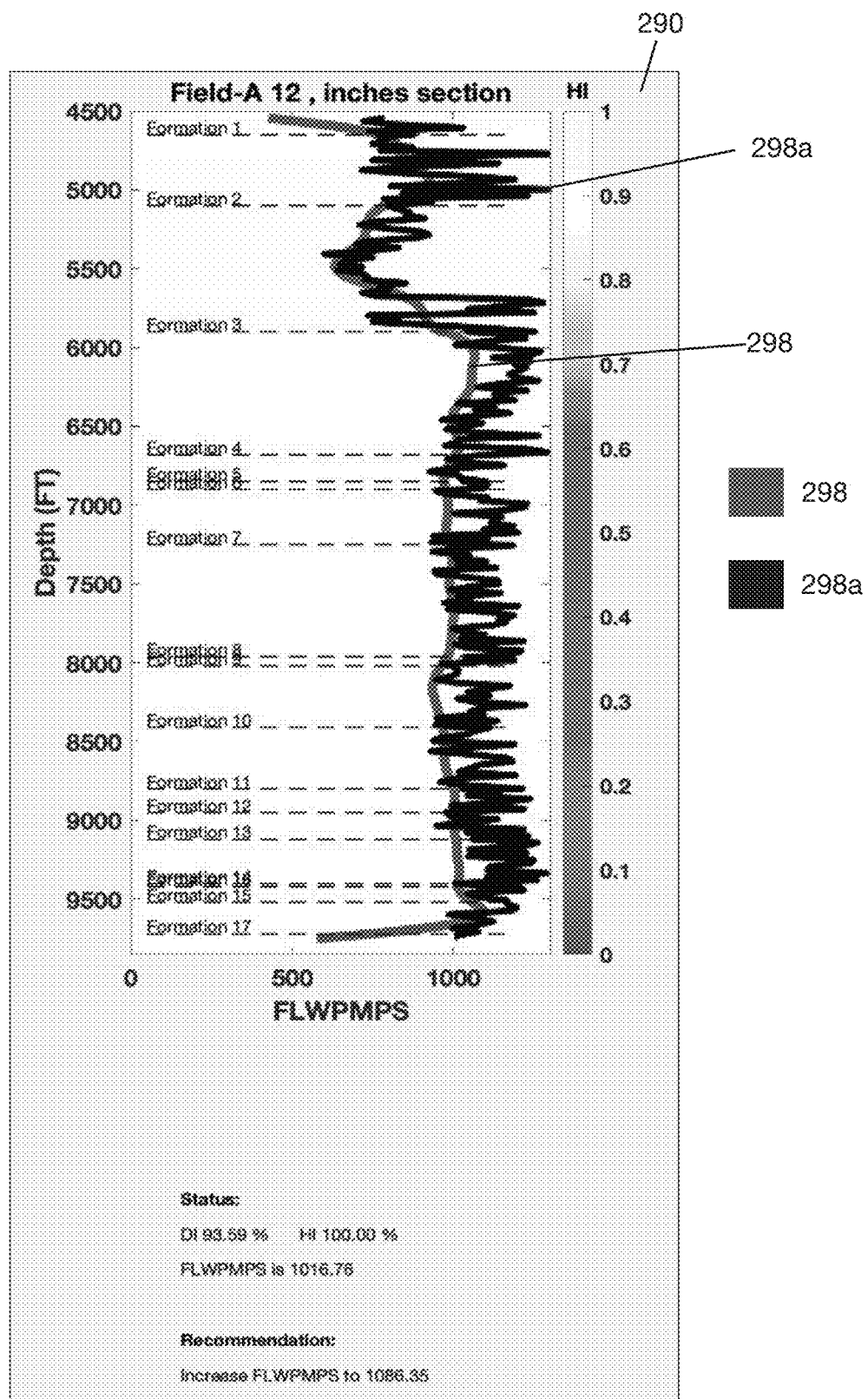
FIG. 5D shows live data superimposed on the operating envelope of FIG. 4D.

FIG. 5A shows the portion of the interface shown in FIG. 4A updated with live data 292a from drilling operations. Below the plot shown in FIG. 5A are additional information, e.g., accumulated ROP efficiency as of the last drilling depth for which live data is available, the ROP at the last depth for which live data is available, and a recommendation based on comparison of the live data to the trained model. For this example, the advisor logic has determined that ROP is lower than recommended—this can be observed by the live data 292a being generally to the left of the optimal curve 292. To remedy this, RPM, WOB, and FLWPMPS can be increased. FIG. 5B shows the portion of the interface shown in FIG. 4B updated with live data 294a from drilling operations and the amount by which RPM may be increased while remaining within the operating envelope. FIG. 5B reports a RPM of 142.53 at the last depth for which live data is available. FIG. 5C shows the portion of the interface shown in FIG. 4C updated with live data 296a from drilling operations and the amount by which WOB may be increased while remaining within the operative envelope. FIG. 5C reports a WOB of 44.79 klb (1 klb=4448.2 N) at the last depth for which live data is available. FIG. 5D shows the portion of the interface shown in FIG. 4D updated with live data 298a from drilling operations and the amount by which FLWPMPS may be increased while remaining within the operative envelope. FIG. 5D reports FLWPMPS of 1016.76 gpm at the last depth for which live data is available. In general, the advisor logic matches depth and geological formation between the well that is being actively drilled (live data) and the model/optimum curve for each parameter (RPM, WOB, FLWPMPS). For each parameter, the value of the parameter from the active live data and the value of the parameter from the model/optimum curve are compared. If the value of the parameter from the live data is lower than the value of the parameter from the model/optimum curve, the advisor produces a recommendation to increase the parameter. On the other hand, if the value of the parameter from the live data is higher than the value of the parameter from the model/optimum curve, the advisor produces a recommendation to decrease the parameter. The recommendations can be provided in real time per depth step or interval.

Figure 6:
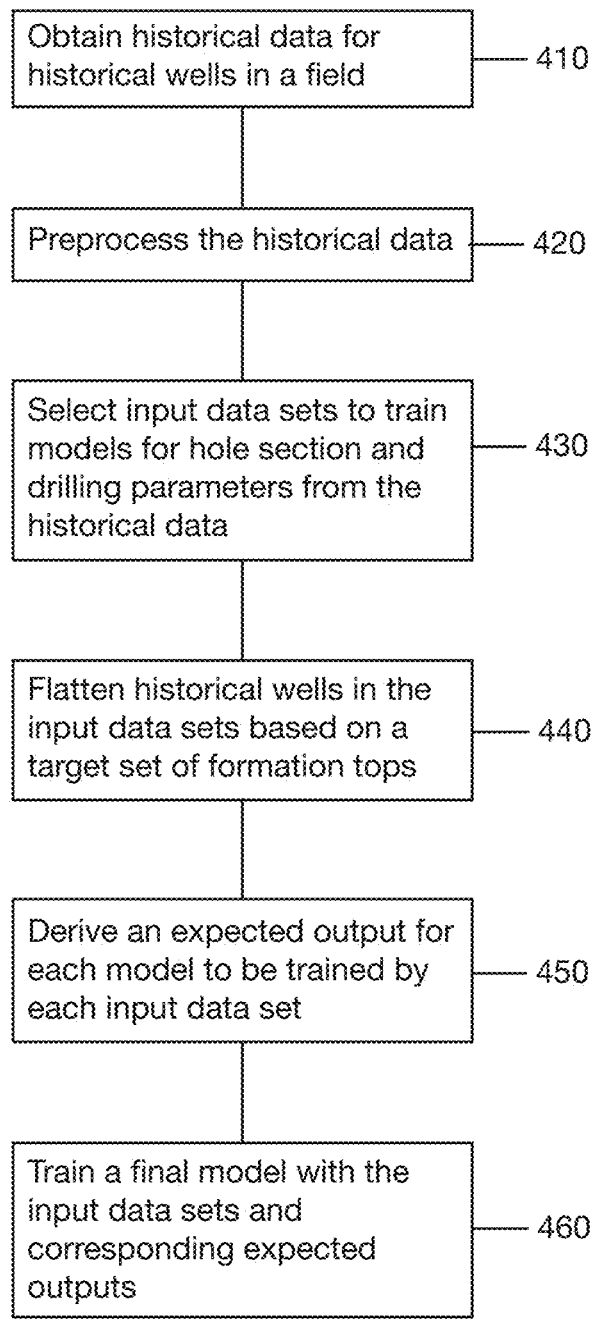
FIG. 6 is a flow diagram of a method for training a model according to one illustrative implementation.

FIG. 6 illustrates a method of generating trained model 210 (in FIGS. 2 and 3) according to one illustrative implementation. The trained model is generated with data from a field in which a new well is to be drilled. The field is a geographic region. The field may be a hydrocarbon field (i.e., the field has subsurface formations with rock pores containing hydrocarbons such as oil and gas). Each well drilled or to be drilled in the field will typically have a wellbore geometry specified in its associated drilling plan. The wellbore geometry specifies a number of hole sections to make up the length of the wellbore, each hole section having a size (diameter) and a length. The size of the hole section is determined by the specific drill bit size used in forming the hole section. Typical hole section sizes found in wellbore geometries are 36 inches (91.44 cm), 24 inches (60.96 cm), 17½ inches (44.45 cm), 12¼ inches (31.11 cm), and 8½ inches (21.59 cm). However, these hole sizes are not intended to be limiting. A wellbore may have all of these hole section sizes, some of these hole section sizes, or other hole section sizes. The hole sections making up a wellbore are typically arranged starting from the largest hole section size to the smallest hole section size.

Figure 7:
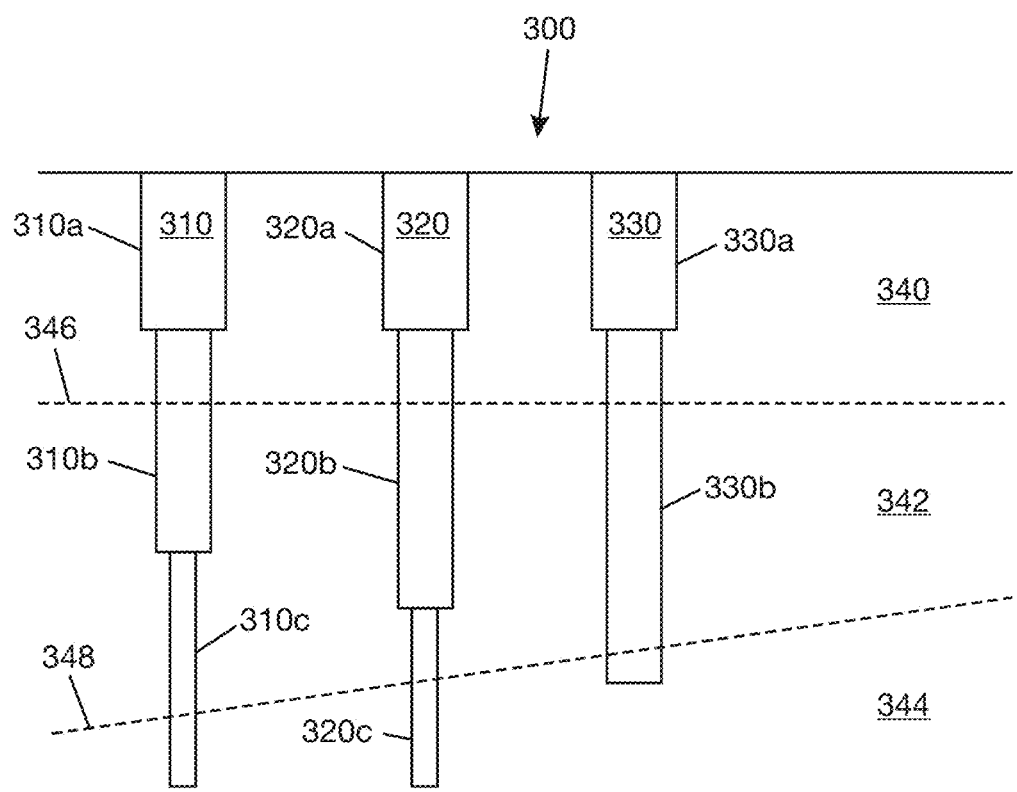
FIG. 7 is a schematic diagram of a portion of a field with historical wells.

The field used in producing the trained model has a plurality of historical wells, which are existing wells. For illustration purposes, FIG. 7 shows an example of a portion of a field with historical wells 310, 320, 330. Historical wells 310, 320, 330 are shown as vertical wells for ease of illustration. However, they could be inclined or horizontal wells. Three historical wells are shown. However, a field that is to be used for model training purposes will have many more historical wells, e.g., at least ten historical wells. Typically, the minimum number of historical wells is 3. The historical wells are also shown in a linear arrangement for ease of illustration. However, the historical wells do not need to be in a linear arrangement and can be distributed in any desired pattern across the field. Each historical well is drilled in sections. For example, well 310 has hole sections 310a, 310b, 310c; well 320 has hole sections 320a, 320b, 320c; and well 330 has hole sections 330a, 330b. The number and sizes of hole sections for wells 310, 320, 330 are merely for illustration purposes. Each hole section is a portion of a wellbore and has a size (or diameter) and length. Two hole sections are considered to be the same if they have the same size. Field 300 may include various subsurface formations, illustrated as formation horizons (or formation layers) 340, 342, 344. Dashed line 346 indicates the boundary between formation horizons 340, 342, and dashed line 348 indicates the boundary between formation horizons 342, 344. Formation tops are the depths in a well at which formations are found in the subsurface, typically measured in feet below a reference elevation. The formation tops for historical wells 310, 320, 330 occur where the historical wells intersect dashed lines 346, 348.

Returning to FIG. 6, the method of generating the trained model includes obtaining historical data for historical wells in the field (410). The historical data includes historical drilling data for the historical wells. Typically, the surface portion of the historical drilling data (historical surface drilling data) is used in training the model. The historical surface drilling data may include ROP data (data related to rate of penetration during drilling), WOB data (data related to weight on bit during drilling), RPM data (data related to drill string rotational speed during drilling), FLWPMPS data (data related to flow rate of mud pumps). The historical surface drilling data may include other surface drilling data not specifically mentioned, such as torque data. The historical data further includes geological formation tops data for the historical wells. The historical data may be obtained through a well data service, from a data storage, or by actively collecting data from well sites during drilling of historical wells.

The method includes pre-processing the historical data to ensure consistency and uniformity and to remove any bias introduced by measurement hardware and sensors used to collect the data (410). As an example, pre-processing of the historical data may include removing time and depth duplications from the data. Pre-processing of the historical data may include removing any anomalies in the data set and using interpolation as needed to cover any missing data points. Various methods are known in the art that may be used to fit curves of data and interpolate data points onto a uniform sampling grid. Pre-processing of the historical data may include reconstructing the data set as a function of depth by following a fixed depth step for all the historical wells, thereby unifying the data frequency in the depth domain.

The method includes selecting input data sets to train models for hole sections and drilling parameters (420). Given a set of parameters for a drilling operation and a set of hole section sizes defining a wellbore geometry, an input data set is selected for each combination of a parameter in the set of drilling parameters and a hole section size in the set of hole section sizes. Thus, if there are m hole section sizes in the set of hole section sizes and n types of drilling parameters to be automatically controlled, m×n input data sets will be selected. In one implementation, the parameters in the set of parameters include ROP (rate of penetration of drilling), WOB (weight on bit during drilling), RPM (drill string rotational speed), and FLWPMPS (mud pump flow). The set of hole section sizes may be based on a planned well to be drilled in the field.

An exemplary procedure for selecting input data sets for each combination of hole section size and ROP follows: For each hole section size, historical wells that meet predetermined conditions are selected. These predetermined conditions are that the historical wells are in the same field, that the historical wells have hole sections with the hole section size, that the hole sections with the hole section size are drilled with the same mud type, the same bit type, and the same drilling plan. Then, a predetermined number of top performing historical wells are identified from the historical wells that meet the predetermined conditions. The criterion for top performance is based on the highest average ROP for the hole section size. In general, each hole section for an historical well is drilled in depth steps. Each depth step may have an instantaneous value of ROP. By taking an average of the instantaneous values of ROP across the hole section, an average ROP for the hole section size may be obtained. Average in this regard may be mean, median, or other statistical average. Each of the historical wells will have an average value of ROP for the hole section size. The historical wells that meet the predetermined conditions may be ranked according to the average values of ROP. The top performing historical wells may be selected from the top number or percentage of the ranked historical wells. The predetermined number of top performing historical wells selected may be an actual number, such as the top ten of the ranked historical wells or the top 50% of the ranked historical wells. This can be described as selecting the historical wells with average ROP for the hole section size exceeding a threshold, where the threshold may be selected to achieve a desired number of top performing historical wells in the input data set. The top performing historical wells selected for each hole section size will produce one of the input data sets based on ROP.

The preceding procedure may be repeated for each of WOB, RPM, and FLWPMPS, where each of WOB, RPM, and FLWPMPS will replace ROP as the performance measure of the historical wells. The result will be input data sets for each combination of hole section size and WOB, input data sets for each combination of hole section size and RPM, and input data sets for each combination of hole section size and FLWPMPS.

The method includes flattening the historical wells in the input data sets with respect to formation tops (440). In one implementation, the flattening procedure includes determining target formation tops for a well. The target formation tops may be formation tops forecasted for a planned well. The preprocessed geological formation tops data are posted on the preprocessed historical drilling data (or on the historical surface drilling data). The preprocessed historical drilling data (or historical surface drilling data) are then flattened based on the target formation tops. The result will be input data sets including historical wells with formation tops that are aligned with target formation tops along formation horizons. Flattening is a calibration based on the "planned well" forecasted formation tops to represent the depth variation of geological formation within the same field. This is achieved by either stretching or squeezing of historical wells vertically (depth) to match depth of the "planned well". In case of stretching, the parameter values of the historical well is interpolated (more number of values will be produced). In case of squeezing, the parameter values of the historical well is averaged (less number of values will be produced). By flattening the data, similar features of a formation may be mapped from one well to another by stretching and/or compressing the depth separation between features.

Figure 8:
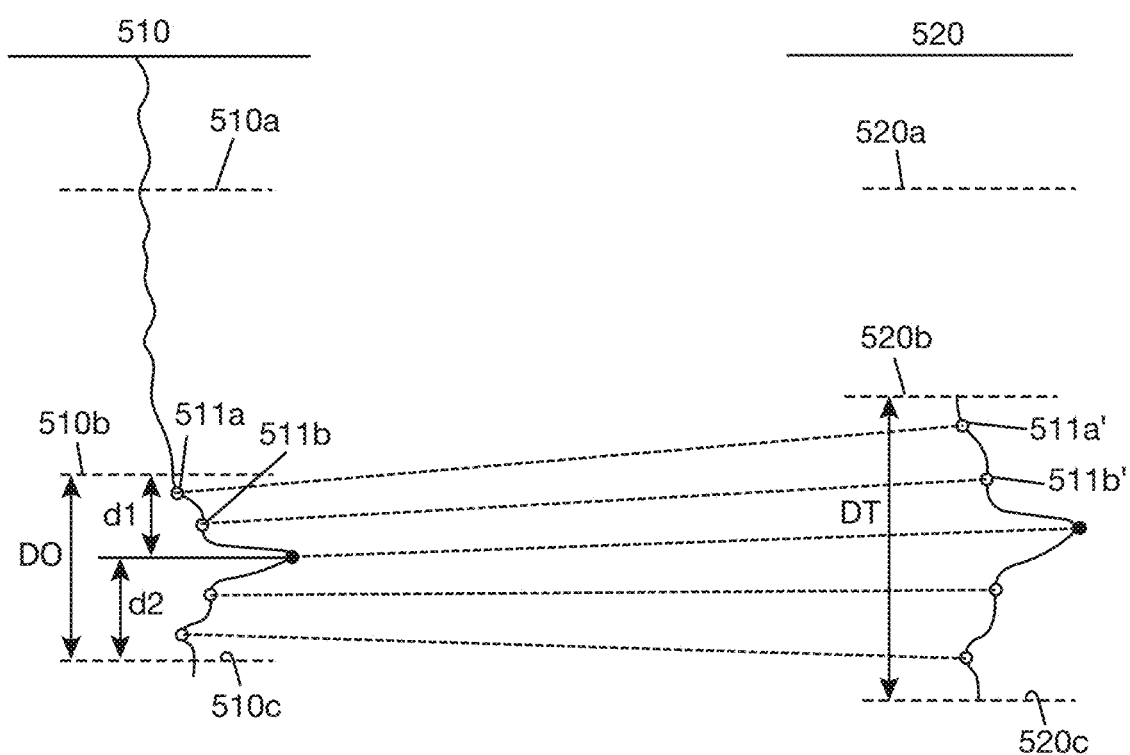
FIG. 8 is a schematic diagram illustrating flattening of an historical well based on target formation tops.

FIG. 8 shows an example of stretching of historical well 510 to match the depth of a planned well 520. Well 510 has formation tops 510a, 510b, 510c. FIG. 8 shows target formation tops 520a, 520b, 520c, which may be forecasted formation tops of a planned well. For illustrative purposes, formation tops 510b, 520b are associated with the same formation horizon. Also, formation tops 510c, 520c are associated with the same formation horizon. The depth distance between formation tops 510b, 510c may be represented by DO. The depth distance between formation tops 520b, 520c may be represented by DT. In this case, DO and DT are not the same. Flattening of historical well 510 to align formation tops 510b, 510 with target formation tops 520b, 520c involves adjusting DO to match DT while maintaining the relationship between DO and the data points between formation tops 510b and 510c. The relationship between the depth of a data point between formation tops 510b and 510c may be expressed as d1/DO or d2/DO, where d1 is the depth distance between the data point and formation top 510b, d2 is the depth distance between the data point and formation top 510c, and d1+d2=DO. The data point can be projected to DT by adjusting d1 to d1*(DT/DO) or adjusting d2 to d2*(DT/DO). A similar procedure can be carried out to project data points between formation tops 510a, 510b to data points between formation tops 520a, 520b. For further illustration of stretching, datapoint 511a in historical well 510 becomes datapoint 511a' in the stretched well, and data point 511b in historical well 510 becomes datapoint 511b' in the stretched well. Note that there will be more datapoints between 511a' and 511b' compared to between original 511a and 511b due to the stretching.

Returning to FIG. 6, the method includes deriving an expected output (or recommendation) for each model to be trained by each of the input data sets (450). The expected output is derived such that ROP is enhanced and non-production time (NPT) is minimized. In general, NPT herein is drilling induced NPT, e.g., NPT due to stick pipe incidents, low ROP incidents, bit balling, and complete bit wear. The following procedure for deriving expected output applies to each input data set.

For each input data set, the historical wells included in the input data set are vetted against probabilities of NPT. Any historical well with previous drilling-induced NPT for the hole section size associated with the input data set is removed from the input data set. The expected output is then built at a predetermined depth step rate (e.g., 5 ft, 10 ft, and so on). The depth step is along a length of the hole section. For each depth step, N historical wells with the highest instantaneous ROP value for the depth step are selected from the input data set. The number N is a value that can be adjusted. Typically, N can be in a range from 3 wells to 10 wells. The N historical wells are ranked based on a nearest neighbor algorithm that minimizes distance and weighted based on their ranks. For example, the wells may be ranked and weighted by Inverse Distance Weight (IDW) interpolation, as described by Equation (1) below:

$$d(s_0) = \frac{\sum_{i=1}^{N} \omega_i P d(s_i)}{N} \quad (1)$$

where P is a drilling parameter (WOB, RPM, GPM), $P_d(S_0)$ is the output/recommended parameter value at depth (d) of the new well, $P_d(S_i)$ is the parameter value at depth (d) of the $i^{th}$ well, $\omega_i$ is an inverse weight of distance (where the average of all the $w_i$=number of well input (N)), i is number of well (1 to 4), and N is the total number of input well.

Minimum, maximum, and weighted mean (optimum) values for the drilling parameter associated with the input data set are produced based on the ranked and weighted historical wells. Each depth step will have a window of values for the drilling parameter based on the minimum, maximum, and weighted mean values for the drilling parameter determined for that depth step. If there are number k depth steps for an input data set, there will be number k windows of values for the drilling parameter for the input data set. The windows of values represent an operating envelope for the drilling parameter for the hole section size.

Each input data set and corresponding expected output forms a training data set. The method may include providing a learning algorithm with the training data sets (input data sets and corresponding expected outputs) (460). The result will be a final model that can be used as trained model 210 in FIGS. 2 and 3.

Figure 9:
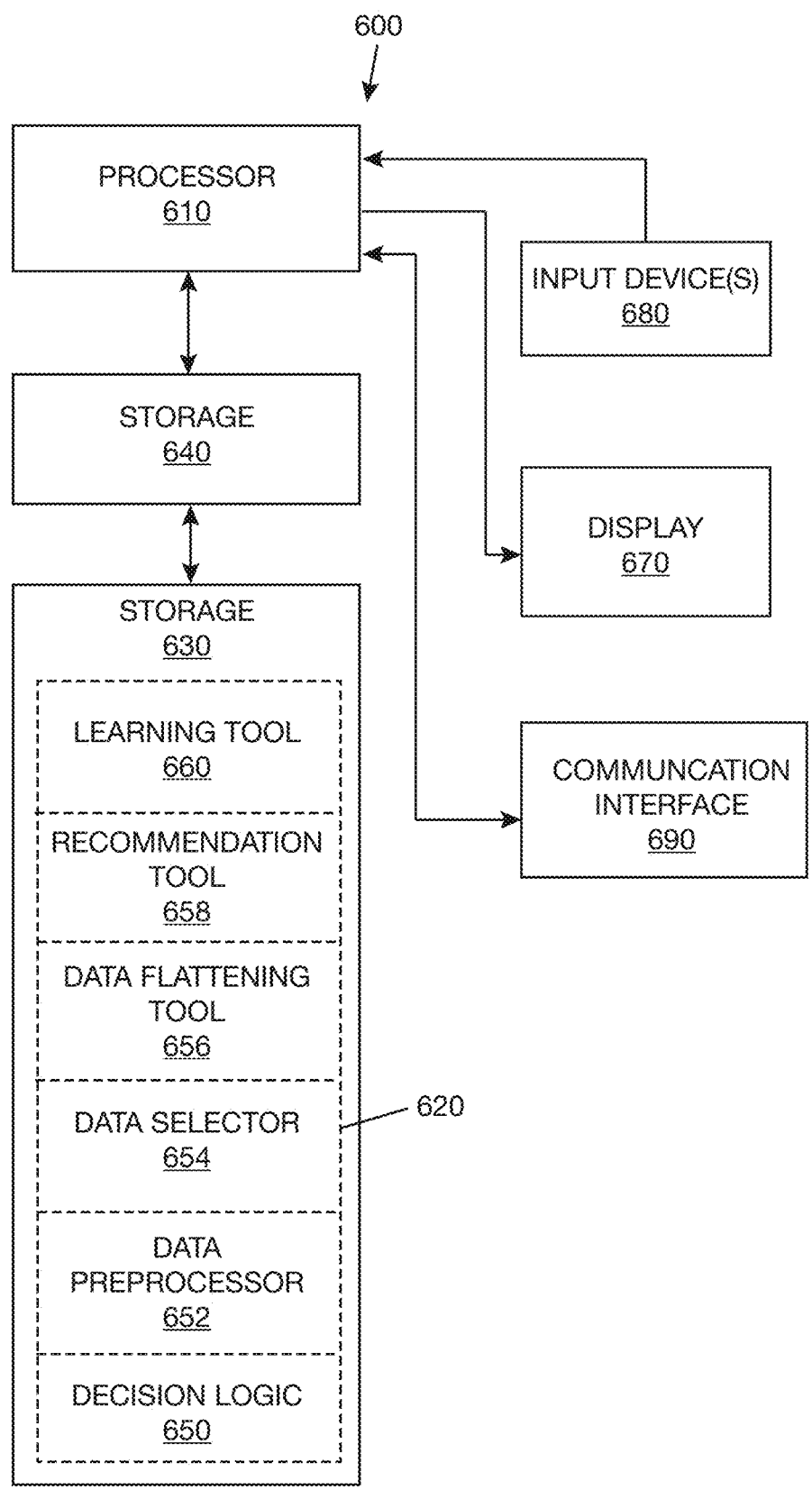
FIG. 9 is a block diagram of a model training system and corresponds to the method of FIG. 6.

FIG. 9 is a schematic diagram of an exemplary system 600 that can be used to generate a trained model according to the method described with reference to FIG. 6. System 600 may include a processor 610 and a model training tool box (MTTB) 620 having instructions to be executed by processor 610. MTTB 620 may be stored in a persistent storage 630 and loaded into a non-persistent storage 640 for execution by processor 610. In one implementation, MTTB 620 includes decision logic 650, data preprocessor 652, data selector 654, data flattening tool 656, recommendation tool 658, and learning tool 660. Data preprocessor 652 includes logic to preprocess historical data for historical wells as described in connection with 410 in FIG. 6. Data selector 654 includes logic to select input data sets from historical data for historical wells as described in connection with 420 in FIG. 6. Data flattening tool 656 includes logic to flatten historical data based on target formation tops as described in connection with 440 in FIG. 6. Recommendation tool 658 includes logic to generate expected outputs for input data sets as described in connection with 450 in FIG. 6. Learning tool 660 includes a learning algorithm to train a model with trained data sets as described in connection with 460 in FIG. 6. During execution of decision logic 650, processor 610 receives or obtains historical data, which includes historical drilling data and geological formation tops data for historical wells. Processor 610 provides the historical data to data preprocessor 652. Processor 610 provides preprocessed data from data preprocessor 652 to data selector 654 and data flattening tool 656. Data selector 654 generates input data sets. Data flattening tool 656 flattens the input data sets. Processor 610 provides flattened input data sets to recommendation tool 658. Processor 610 prepares training data sets from expected outputs generated by recommendation tool 658 and the flattened input data sets. Processor 610 provides the training data sets to learning tool 660, which outputs a trained model. Processor 610 may store the trained model or output the trained model to another system, such as a drilling control system.

Processor 610 may be any machine that performs computational operations. For example, processor 610 may be a central processing unit (CPU), a microprocessor, a controller, an application specific integrated circuit (ASIC), system on chip (SOC), or a field-programmable gate array (FPGA). Each of storages 630, 640 may be a non-transitory computer-readable storage medium that stores data and instructions and may include one or more of random-access memory (RAM), read-only memory (ROM), Flash memory, solid state drive, or other processor-readable storage medium. System 600 may include a display 670. A user interface of MTTB 620 may be presented on display 670 during execution of MTTB 620. System 600 may include input device(s) 680, such as a keyboard and mouse, to enable user interaction with a user interface presented on display 670. System 600 may include a communication interface 690 for connection to a network. For example, processor 610 may receive historical data or output the trained model through a connection with a network. System 600 may be a standalone system or may be a node on a network. In one example, system 600 may be implemented in a mobile laboratory. In another example, MTTB 620 may be stored in the cloud and accessed remotely from a computer. In this case, at least a portion of the instructions of MTTB 120 may be executed by a remote processor.

Although specific embodiments, implementations, and examples have been described for illustrative purposes, various equivalent modifications can be made without departing from the spirit and scope of the disclosure, as will be recognized by those skilled in the relevant art. The teachings provided herein can be applied to other drilling systems besides the exemplary drilling system generally described above.

What is claimed is:
1. A method, comprising:
obtaining historical data for a plurality of historical wells in a field, the historical data comprising historical surface drilling data;
determining a set of parameters of a planned drilling operation in the field;
determining a set of hole section sizes defining a wellbore geometry of the planned drilling operation;
for each combination of a first parameter in the set of parameters and each hole section size in the set of hole section sizes, using a computer processor:
selecting a first set of historical wells from the plurality of historical wells, wherein each historical well in the first set of historical wells meets a first predetermined condition and each has an average value of the first parameter exceeding a first threshold for the hole section size;
generating, from the first set of historical wells, a first input data set; and
deriving a plurality of first parameter expected output value windows for the first input data set, wherein each of the plurality of first parameter expected output value windows corresponds to a depth step along a depth of the hole section size;
for each combination of a second parameter in the set of parameters and each hole section size in the set of hole section sizes, using the computer processor:
selecting a second set of historical wells from the plurality of historical wells, wherein each historical well in the second set of historical wells meets a second predetermined condition and each has an average value of the second parameter exceeding a second threshold for the hole section size;
generating, from the second set of historical wells, a second input data set; and
deriving a plurality of second parameter expected output value windows for the second input data set, wherein each of the plurality of second parameter expected output value windows corresponds to the depth step along the depth of the hole section size;

training, by the computer processor, a model using the first input data sets, the plurality of first parameter expected output value windows, the second input data sets, and the plurality of second parameter expected output value windows to produce a trained model; and determining, by the computer processor, an operating envelope for at least one parameter in the set of parameters from the trained model.

2. The method of claim 1, further comprising adjusting, by the computer processor, the plurality of historical wells to have aligned formation tops with a target set of formation tops-prior to deriving the plurality of first parameter expected output value windows and the plurality of second parameter expected output value windows.

3. The method of claim 1, wherein the first predetermined condition comprises at least one of: (a) a historical well hole section size matches the hole section size, (b) a historical well mud type matches a mud type of the planned drilling operation, (c) a historical well bit type matches a bit type of the planned drilling operation, and (d) a historical well drilling plan matches a drilling plan of the planned drilling operation.

4. The method of claim 1, wherein selecting the first set of historical wells and the second set of historical wells comprises:

selecting, by the computer processor, a first set of candidate historical wells that meet the first predetermined condition, each of the first set of candidate historical wells having an average value of the first parameter;

selecting, by the computer processor, a second set of candidate historical wells that meet the second predetermined condition, each of the second set of candidate historical wells having an average value of the second parameter;

ranking, by the computer processor, the first set of candidate historical wells according to the average value of the first parameter;

ranking, by the computer processor, the second set of candidate historical wells according to the average value of the second parameter;

selecting, by the computer processor, a predetermined top number of the first set of candidate historical wells as the first set of historical wells; and selecting, by the computer processor, a predetermined top number of the second set of candidate historical wells as the second set of historical wells.

5. The method of claim 1, wherein deriving the plurality of first parameter expected output value windows and the plurality of second parameter expected output value windows comprises:

removing from consideration, by the computer processor, any historical wells having drilling-induced non-production time.

6. The method of claim 1, wherein deriving the plurality of first parameter expected output value windows and the plurality of second parameter expected output value windows comprises:

for each historical well in the first set of historical wells and the second set of historical wells, determining, by the computer processor, the depth step;

selecting, by the computer processor, at least three historical wells from the first set of historical wells and at least three historical wells from the second set of historical wells based on the rate of penetration values for each depth step;

generating, by the computer processor, at least three separate first parameter values for the first parameter for the first set of historical wells; and generating, by the computer processor, at least three separate second parameter values for the second parameter for the second set of historical wells.

7. The method of claim 6, wherein generating, by the computer processor, the at least three separate first parameter values and the at least three separate second parameter values comprises ranking the at least three historical wells from the first set of historical wells and the at least three historical wells from the second set of historical wells by nearest neighbor.

8. The method of claim 1, further comprising unifying, by the computer processor, a depth frequency of the historical data in a depth domain.

9. The method of claim 1, wherein determining the set of parameters of the planned drilling operation in the field comprises determining, by the computer processor, the set of parameters including the rate of penetration during drilling, weight on bit during drilling, rotational speed of a drill string during drilling, and flow rate of at least one pump during drilling.

10. The method of claim 1, further comprising guiding drilling of a well in the field using each operating envelope, wherein guiding drilling of a well in the field using each operating envelope comprises selectively adjusting a control setpoint for each parameter based on each respective operating envelope.

11. The method of claim 1, further comprising executing the planned drilling operation on a well in the field using each operating envelope, wherein executing the planned drilling operation on the well in the field using each operating envelope comprises monitoring the rate of penetration of the planned drilling operation as a function of depth and selectively adjusting a control setpoint for each parameter in response to a deviation of the rate of penetration of the planned drilling operation from a predetermined value for a current depth of the planned drilling operation, wherein the predetermined value is based on the operating envelope for the rate of penetration obtained from the trained model.

12. A method of drilling a well in a field, comprising:

performing a drilling operation by operating a drill string to drill a hole section of a wellbore in the field, the hole section having a selected hole section size;

determining a set of parameters related to the drilling operation;

obtaining an operating envelope for each parameter in the set of parameters from a model trained with a plurality of historical wells in the field having an average rate of penetration of drilling for the selected hole section size that exceeds a threshold and a zero drilling-induced non-production time for the selected hole section size; and selectively adjusting a control setpoint for each of the set of parameters based on each respective operating envelope.

13. The method of claim 12, further comprising monitoring a rate of penetration of the drilling operation as a function of depth and selectively adjusting the control setpoint for each of the set of parameters in response to a deviation of the rate of penetration of the drilling operation from a predetermined value for a current depth of the drilling operation, wherein the predetermined value is based on the operating envelope for the rate of penetration obtained from the model.

14. A non-transitory computer readable medium storing instructions executable by a computer processor, the instructions comprising functionality for:
- obtaining historical data for a plurality of historical wells in a field, the historical data comprising historical surface drilling data;
- determining a set of parameters of a planned drilling operation in the field;
- determining a set of hole section sizes defining a wellbore geometry of the planned drilling operation;
- for each combination of a first parameter in the set of parameters and each hole section size in the set of hole section sizes:
  - selecting a first set of historical wells from the plurality of historical wells, wherein each historical well in the first set of historical wells meets a first predetermined condition and each has an average value of the first parameter exceeding a first threshold;
  - generating, from the first set of historical wells, a first input data set; and
  - deriving a plurality of first parameter expected output value windows for the first input data set, wherein each of the plurality of first parameter expected output value windows corresponds to a depth step along a depth of the hole section size;
- for each combination of a second parameter in the set of parameters and each hole section size in the set of hole section sizes:
  - selecting a second set of historical wells from the plurality of historical wells, wherein each historical well in the second set of historical wells meets a second predetermined condition and each has an average value of the second parameter exceeding a second threshold for the hole section size;
  - generating, from the second set of historical wells, a second input data set; and
  - deriving a plurality of second parameter expected output value windows for the second input data set, wherein each of the plurality of second parameter expected output value windows corresponds to the depth step along the depth of the hole section size;
- training a model using the first input data sets, the plurality of first parameter expected output value windows, the second input data sets, and the plurality of second parameter expected output value windows to produce a trained model; and
- determining an operating envelope for at least one parameter in the set of parameters from the trained model.

15. The non-transitory computer readable medium of claim 14, wherein the instructions further comprise functionality for adjusting the historical wells have aligned formation tops with a target set of formation tops prior to deriving the plurality of first parameter expected output value windows and the plurality of second parameter expected output value windows.

16. The non-transitory computer readable medium of claim 14, wherein the first predetermined condition comprises at least one of: (a) a historical well hole section size matches the hole section size, (b) a historical well mud type matches a mud type of the planned drilling operation, (c) a historical well bit type matches a bit type of the planned drilling operation, and (d) a historical well drilling plan matches a drilling plan of the planned drilling operation.

17. The non-transitory computer readable medium of claim 14, wherein the instructions further comprise functionality for removing from consideration any historical wells having drilling-induced non-production time.

18. The non-transitory computer readable medium of claim 14, wherein the instructions further comprise functionality for guiding drilling of a well in the field with each operating envelope.

* * * * *